United States Patent
Tien et al.

(10) Patent No.: US 7,079,998 B2
(45) Date of Patent: Jul. 18, 2006

(54) METHOD FOR ANALYZING POWER NOISE AND METHOD FOR REDUCING THE SAME

(75) Inventors: Hao-Luen Tien, Taipei (TW); Shang-Yi Chen, Changhua (TW); Ming-Huan Lu, Chu Pei (TW); Chun-An Tu, Tainan (TW)

(73) Assignee: Silicon Integrated Systems Corporation (TW)

( * ) Notice: Subject to any disclaimer, the term of this patent is extended or adjusted under 35 U.S.C. 154(b) by 492 days.

(21) Appl. No.: 10/299,361

(22) Filed: Nov. 19, 2002

(65) Prior Publication Data

US 2004/0030511 A1    Feb. 12, 2004

(30) Foreign Application Priority Data

Aug. 12, 2002  (TW) .................................... 91118119

(51) Int. Cl.
   *G06F 17/50*  (2006.01)
   *H01L 25/00*  (2006.01)
(52) U.S. Cl. ..................... 703/18; 703/2; 716/4; 716/6; 716/10
(58) Field of Classification Search ................. 703/18, 703/2; 716/8, 10, 14, 6, 4
See application file for complete search history.

(56) References Cited

U.S. PATENT DOCUMENTS

| | | | |
|---|---|---|---|
| 4,247,007 A * | 1/1981 | Kai ............................. 209/392 |
| 6,026,223 A * | 2/2000 | Scepanovic et al. .......... 716/10 |
| 6,292,929 B1 * | 9/2001 | Scepanovic et al. .......... 716/14 |
| 6,618,847 B1 * | 9/2003 | Hulse et al. ..................... 716/8 |
| 6,665,843 B1 * | 12/2003 | Frech et al. .................... 716/4 |
| 2002/0083175 A1 * | 6/2002 | Afek et al. .................. 709/225 |
| 2003/0175161 A1 * | 9/2003 | Gabriel et al. ................ 422/90 |
| 2003/0212973 A1 * | 11/2003 | Lin et al. ....................... 716/6 |

* cited by examiner

Primary Examiner—Thai Phan
(74) Attorney, Agent, or Firm—The Webb Law Firm

(57) ABSTRACT

A method for analyzing power noise and method for reducing the same are disclosed, wherein the present invention is utilized in an IC design process. First, a DC analysis is performed with a related IC design by utilizing computer aided design (CAD) software and circuit simulation software for obtaining a power network model of the IC design. Then, the power network model is defined as being composed of a plurality of unit blocks. After analysis, the quantity and type, etc., of components connected electrically to each of the unit blocks are recognized and are regarded as component reference data of each of the unit blocks. Afterwards, according to the component reference data of each of the unit blocks, the voltage drop (IR drop) occurring in operation for each of the unit blocks is evaluated and obtained by utilizing an equivalent circuit constructed by components that are connected electrically to each of the unit blocks. Therefore, the voltage consumption and distribution in each region of the power network model are obtained, so that at least one appropriate capacitor can be placed on proper locations of the power network model, to compensate the voltage drop caused by the IC design components while in operation, and to decrease the power noise in the IC design.

8 Claims, 3 Drawing Sheets

METHOD FOR ANALYZING POWER NOISE AND METHOD FOR REDUCING THE SAME

FIELD OF THE INVENTION

The present invention relates to a method for analyzing power noise and method for reducing the same, and more particularly relates to a method for analyzing power noise and method for reducing power noise in an IC design process by placing appropriate capacitors on IC properly, in order to decrease the power noise in the IC.

BACKGROUND OF THE INVENTION

With the technologies of semiconductor process and IC design continuously progressing, ICs with different functions are widely utilized in various products. Meanwhile, the critical dimension of semiconductor components is advanced to a scope of sub-microns, and even to that of deep sub-microns, so that the integrity of IC is increased rapidly. Since there is no sufficient area on the surface of semiconductor structure for producing the interconnections required by semiconductor components, the technique of multilevel interconnection is developed to perform the interconnection and insulation among semiconductor components by utilizing several metal layers and dielectric layers, and the metal interconnections used for supplying power to semiconductor components construct the power network of IC.

In an IC within the deep sub-micro scope, the process and transmission of signal are always interfered by noise greatly, such as leakage current noise, crosstalk noise, reflection noise and power supply noise, etc., wherein the higher the operation frequency of IC is, the more serious interference of the power supply noise will be, so that the analysis of power network is needed.

In analyzing the performance and efficiency of a power network, the electromigration and voltage drop are two major factors that need to be stressed. If the current density driven through a piece of conductive metal line is too high, then the atoms in the metal line will be migrated along the conductive metal line. This phenomenon, known as electromigration, will eventually result in the deterioration of the conductive metal line and the failure of the semiconductor circuit.

In order to let semiconductor components located on different locations receive sufficient operation voltage, excessive voltage drop in a chip has to be avoided. In other words, if the voltage drop occurring in the operation of some on-chip semiconductor components is too large, then the voltage received by the other on-chip semiconductor components (especially by the semiconductor components located on the center portion of the chip) will not be sufficient for operation. Therefore, the performance and efficiency of IC is decreased, and even the erroneous operations will be caused.

With the substantially increasing operation frequency of IC, the switching speed of on-chip semiconductor components is increased synchronously. Since voltage pulses are caused by electrical variations in the switching state of semiconductor components, these voltage pulses will cause temporary voltage drop to the operation power average, and will cause noise between power supply and ground. Therefore, the noise is increased substantially with the increase of operation frequency, transmission speed and density of IC, thus affecting the regular operation of system and causing wrong behaviors.

SUMMARY OF THE INVENTION

In the view of the background of the invention described above, since the operation frequency of IC currently used is getting higher, and the area of chip is also increased due to the technology progresses of semiconductor process and IC design, the voltage drop caused by semiconductor components of IC in operation becomes bigger, and meanwhile, the high operation frequency of semiconductor components generates sever power noise that interferes and pollutes the regular operation signals of circuit and power supply, thus affecting the operation performance of IC and the signal accuracy.

It is the principal object of the present invention to provide a method for analyzing power noise and a method for reducing the power noise. In the IC design process, by defining the power network of a IC layout constructed by many unit blocks, and according to the parameters, such as type and quantity, etc., of components, such as clock buffers, logic components and logic circuits (i.e. D-Flip-Flop) used for constructing clock tree and clock transmission, electrically connected to each of the unit blocks, the power noise and voltage drop caused in operation of each of the unit blocks can be evaluated, so that appropriate capacitors can be placed on proper locations of IC for compensating the voltage drop and decreasing the voltage variation and power noise.

In accordance with the aforementioned purpose of the present invention, the present invention provides a method for analyzing power noise and a method for reducing the same. First, by utilizing computer aided design (CAD) software, a chip power analysis is performed with related IC design data for obtaining a power network model of IC design. Then, the power network model is defined as being constructed by many unit blocks interconnected with each other. After analyzing the related data of IC design, the parameters, such as type and quantity, etc., of components electrically connected to each of the unit blocks are resolved and obtained and regarded as a component reference data of each of the unit blocks. Afterwards, according to each component reference data of each of unit blocks, the voltage drop caused by each of the unit blocks in operation is evaluated by utilizing an equivalent circuit constructed by components that are connected electrically to each of the unit blocks. Therefore, the consumption and distribution of voltage in each region of the power network model are obtained, so as to place appropriate capacitors in proper locations of the power network model, in order to compensate the voltage drop caused by components of IC in operation, and to decrease the power noise in the IC.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
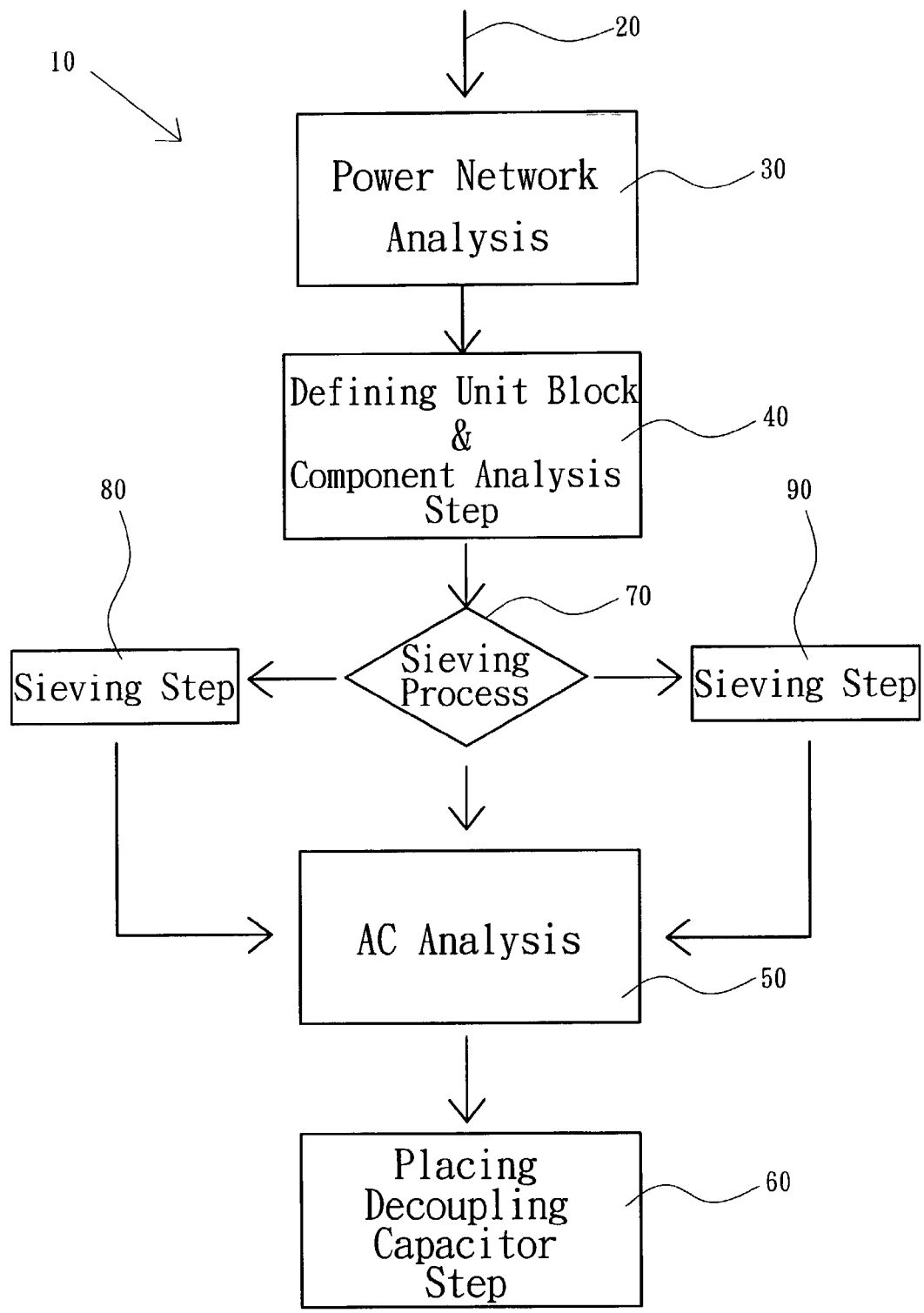
FIG. 1 is a flow chart showing a process of a preferred embodiment of the present invention.

Please referring to FIG. 1, FIG. 1 is a flow chart showing a process of a preferred embodiment of the present invention. As shown in FIG. 1, in order to obtain a power network model of an IC design, related design reference data 20 of IC design are first inputted in the power network analysis 30 of the process flow 10. By utilizing the computer aided design software, a chip power analysis is performed for obtaining the power network model of IC design. According to the power network model of IC design, the related reference data, characteristics and parameters of a DC power network model and an AC power network model of IC design can be obtained, wherein the related reference data of IC design comprises: standard component library, impedance of power network, operation frequency, operation temperature range, temperature coefficient, voltage drop range, each length and width of the metal lines in each metal layer of the power network, distance between metal lines and other related parameters and data, etc.

Figure 2:
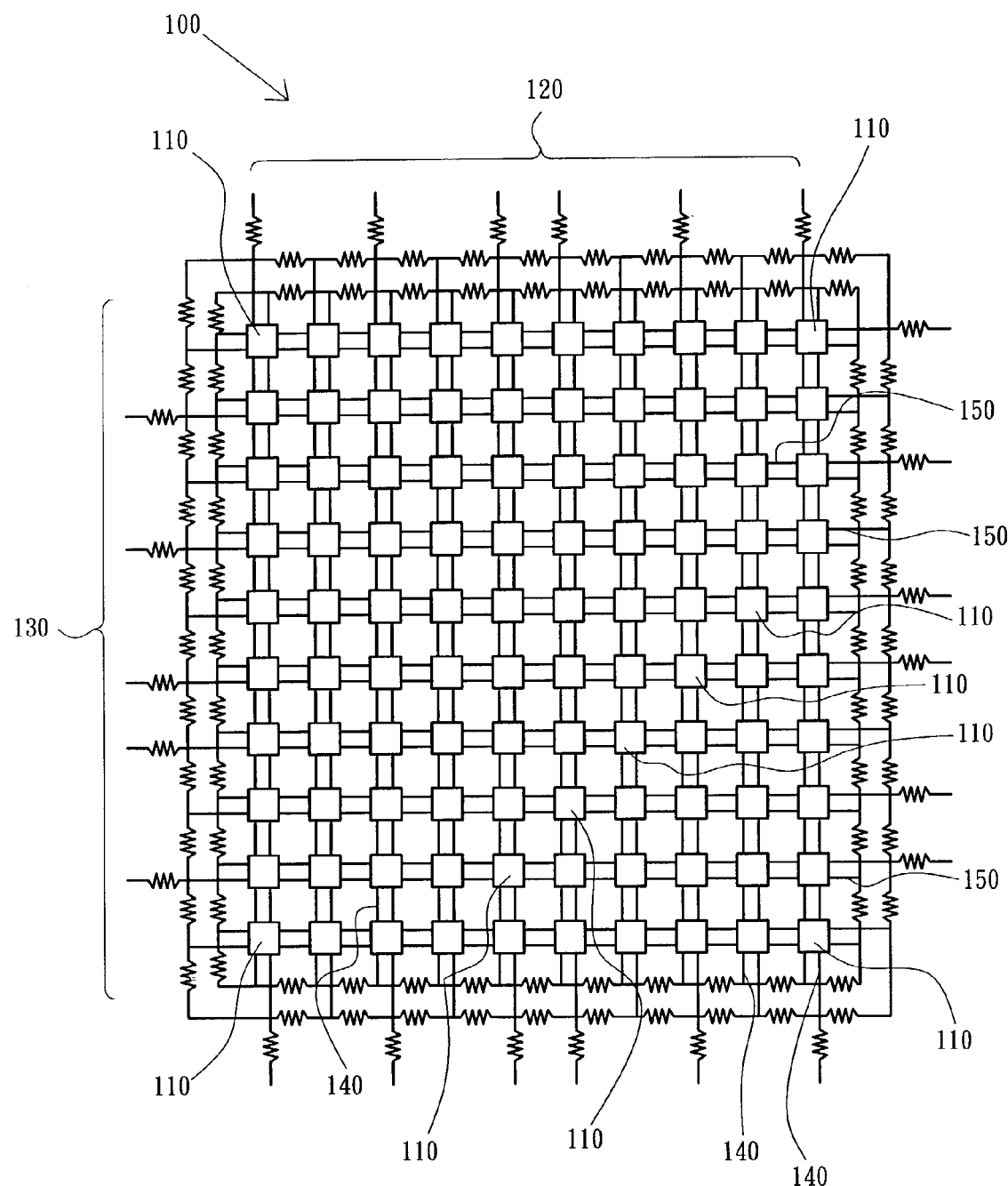
FIG. 2 is a top view showing a defined power network model in IC design process according to FIG. 1.

Please referring to FIG. 2, FIG. 2 is a top view showing a defined power network model in IC design process according to FIG. 1, wherein the power network model 100 is constructed by a metal layer 120 and a metal layer 130, and the metal layer 120 and the metal layer 130 each comprises several metal lines 140 and several lines 150, respectively, and each unit block 110 is interconnected with each other in equivalent circuit manner. After obtaining the power network model 100 of IC design, a defining unit block and components analysis step 40 of the process flow 10 is performed, such as shown in FIG. 1, in order to conveniently simulate and evaluate the steady state and transient state of the enormous power network model 100 in operation. First, according to the area of the power network model 100 and the metal lines in each of the metal layers constructing the power network model 100, the power network model 100 is defined as being constructed by several unit blocks 110 interconnected with each other, wherein the type and quantity of components included in each of the unit blocks 110 are in accordance with the IC design, IC layout and the location and cover area of each unit block 110 located on the power network model 100. Hence, through the defining unit block step, the analysis of power network model of IC design can be further fast and correct.

As shown in FIG. 2, if the power network model 100 is constructed by a metal layer 120 and a metal layer 130, the aforementioned unit block 110 defined for constructing the power network model 100 is a rectangle formed by two metal lines 140 in the metal layer 120 and two metal lines 150 in the metal layer 130.

Figure 3:
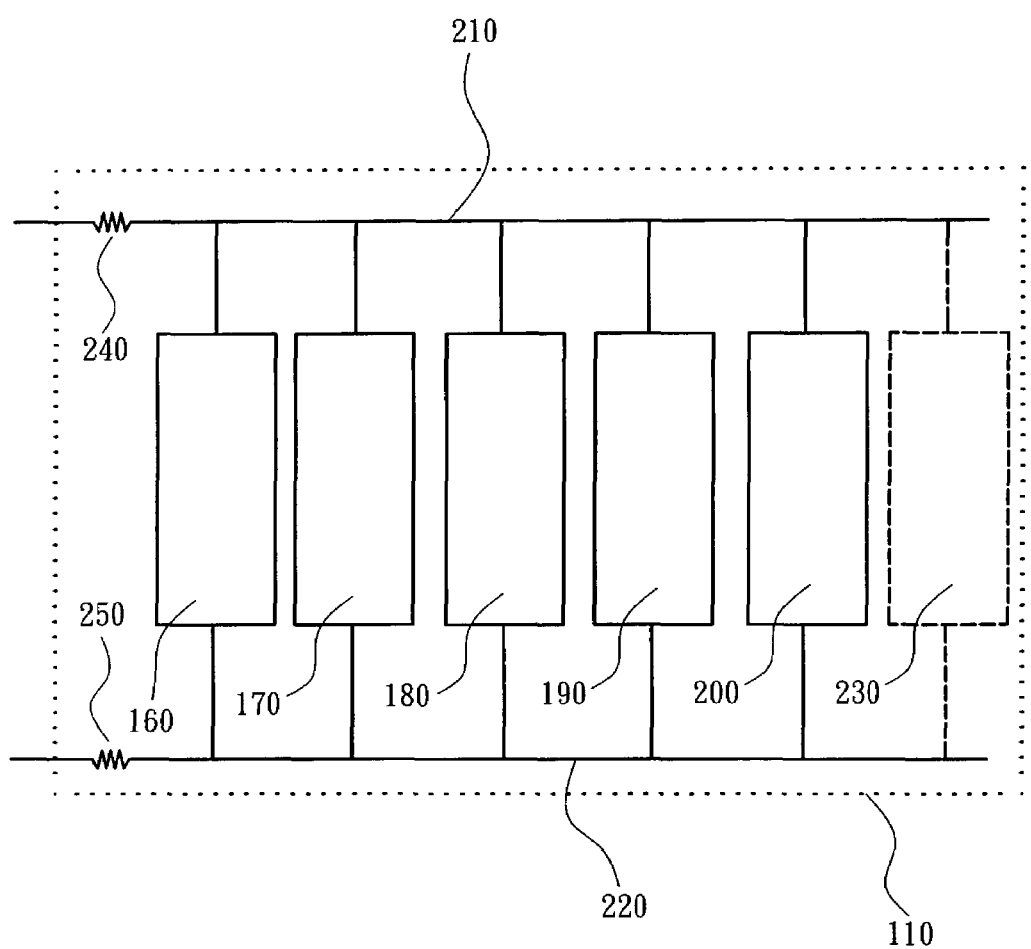
FIG. 3 is a diagram showing the connective relationship of each component in a unit block according to the power network model of FIG. 2.

Please referring to FIG. 3, FIG. 3 is a diagram showing the connective relationship of each component in a unit block according to the power network model of FIG. 2. In the unit block 110 shown in FIG. 3, there are many logic components, clock buffers and logic circuits used for constructing clock tree and clock transmission, such as two logic components (i.e. a D-flip flop 160 and a D-flip flop 170), two clock buffers (i.e. a clock buffer 180 and a clock buffer 190), and other parasitic components 200 (i.e. on-chip parasitic decoupling capacitance), etc., but the type and quantity of components in the unit block 110 are not limited by FIG. 3, and are depended on various designs.

Afterwards, in order to perform an AC analysis onto the power network model 100 constructed by the unit blocks 110 for recognizing and obtaining the voltage drop caused by circuit in each location to which each of the unit blocks 110 corresponded in chip, a transient analysis or AC analysis is performed with components first. By utilizing the related reference data of various components in the standard component library, the analysis is performed onto each of the unit blocks 110 in the power network model 100 shown in FIG. 2 for obtaining the parameters, such as type, quantity, operation parameters, geometric parameters and other related data, of components electrically connected to each of the unit blocks 110.

For example, according to the related reference data of various components in the standard component library, a component analysis is performed onto the unit block 110 shown in FIG. 3, and then it is known that the components electrically connected to the unit block 110 comprise several logic components (i.e. two D-flip flop), two clock buffers and other parasitic components, wherein the D-flip flop 160 is a D-flip flop of first type, and the D-flip flop 170 is a D-flip flop of second type, and the clock buffer 180 is a clock buffer of A type, and the clock buffer 190 is a clock buffer of B type, and other parasitic components 200 comprise on-chip parasitic capacitance and etc. These components are electrically interconnected with each other in the equivalent circuit of unit block 110 through a metal line 210, which is electrically connected to power supply, and a metal line 220, which is electrically connected to ground. Moreover, a resistor 240 of the metal line 210, a resistor 250 of the metal line 220 and the connection of input/output of components electrically connected to the unit block 110 (i.e. the clock inputs of logic components, the outputs and inputs of logic components, the outputs of clock buffers, etc) have to be further concerned, so that the complete reference data of each of the components electrically connected to the unit block 110 can be obtained and regarded as a component reference data of each of the unit blocks 110.

Then, according to the component reference data of each of the unit blocks 110, by utilizing circuit simulation and analysis software, such as Hspice, the AC analysis 50 is performed onto the power network model 100 of IC to evaluate the voltage drop and power consumption of components electrically connected to each of the unit blocks 110, for obtaining the voltage drop and power consumption of each of the unit blocks 110 in the power network model 100. Therefore, the distribution of power decay is known when the power is applied on each location of IC on chips.

However, since the modern ICs have more powerful function gradually, more components and semiconductor components are required in manufacture. Therefore, the quantity of components electrically connected to each of the unit blocks 110 is substantial. If all the related data of components electrically connected to each of the unit blocks 110 is inputted to the AC analysis 50 on the power network model 100, the consumptions of analysis time and system resource will be enormous, thus increasing the IC design cost and the product cost. Thus, as shown in FIG. 1, a sieving process 70 of process flow 10 is performed first before the AC analysis 50 is performed.

The sieving process 70 is based on the parameters, such as type, quantity, operation parameters, geometric parameters and other related data, of each component in the component reference data of each of the unit blocks 110 to evaluate the influence of the voltage drop and power consumption of each of the unit blocks by components, and to screen out certain parameters of some components that affect the voltage drop and power consumption of each of unit blocks lightly. Hence, the data processed in the AC analysis 50 of the power network model 100 is decreased, so that the consumptions of analysis time and system resource are decreased, and meanwhile, the accuracy of an AC analysis result from the AC analysis 50 of power network model 100 is not affected seriously.

For example, in the sieving process 70 of process flow 10 shown in FIG. 1, according to the present invention, the method for analyzing power noise and that for reducing the power noise provides two predetermined sieving steps (i.e. a sieving step 80 and a sieving step 90), in order to explain the related setting and operation, but the implementation method and the quantity of sieving steps in the sieving process are not limited.

The sieving range of the sieving step 80 and that of the sieving step 90 are different but can be modified and adjusted according to various IC designs and utilized components, in order to decrease the consumptions of analysis time and system resource without affecting the accuracy of the AC analysis result of the power network model 100 seriously.

For example, the unit block 110 shown in FIG. 3 comprises a D-flip flop 160 of first type and a D-flip flop 170 of second type. After analyzing and comparing the consumptions of analysis time and system resource of the D-flip flop 160 and those of the D-flip flop 170 in operation, it is known that the consumptions of analysis time and system resource of the D-flip flop 160 of first type is far larger than those of the D-flip flop 170 of second type, so that the related parameters of the D-flip flop 170 can be screened out in evaluating the power consumption and voltage drop of the unit block 110 in operation for decreasing the time consumption of evaluating. Furthermore, according to the IC design, the related data of utilized components and default time consumption of AC analysis, etc., the sieving step 80 is set to utilize the related data of the D-flip flop 160 of first type in the component reference data of unit block 110 in the AC analysis 50 of the power network model 100, and the related data of other components in the component reference data of unit block 110 are screened out. Similarly, other sieving step can be set according to various design conditions and different related data to properly reduce the related data processed in the AC analysis 50 of the power network model 100, in order to decrease the consumptions of analysis time and system resource, and meanwhile, the accuracy of the AC analysis result of the power network model 100 is not decreased sufficiently.

On the other hand, the aforementioned example just only shows the unit block 110 comprising a D-flip flop 160 of first type, a D-flip flop 170 of second type, a clock buffer 180 of A type and a clock buffer 190 of B type. If a unit block comprises a plurality of D-flip flops 160 of first type, a plurality of D-flip flops 170 of second type, and other various components, the related data of all components electrically connected to the unit block have to be analyzed first for determining the related data of which components are utilized in the AC analysis 50. Otherwise, the accuracy of the AC analysis result of the power network model 100 is decreased significantly. Additionally, since the type and quantity of components included in each of the unit blocks 110 are dependence on the design and layout of IC, the type, quantity, data in transient operation and data in static operation of components in each of the unit blocks 110 have to be completely analyzed before setting the sieving step 80 and the sieving step 90, so as to properly set the sieving step for enhancing the operation speed of AC analysis 50, and meanwhile keeping the result of AC analysis 50 with high accuracy.

Furthermore, if an AC analysis result of power network model 100 with high accuracy is required, the sieving process 70 can be omitted and the AC analysis 50 of power network model 100 is performed directly by utilizing the circuit simulation and analysis software, such as Hspice, according to the component reference data of each of unit blocks 110.

After processing the AC analysis 50 with the power network model 100 of IC, an AC analysis result of the power network model 100 is obtained. Through the AC analysis result, designers know the voltage drop and power consumption of each of unit blocks 110 of the power network model 100 in operation, so as to perform proper optimization and adjustment on the IC design.

Otherwise, since temporary voltage drop caused in switching state of components of IC, and particularly, temporary voltage drop caused in switching state of components of IC under high operation frequency will pollute power supply, and interfere signal process, and cause power noise, thus, according to the AC analysis result of the power network model 100, the design regulation of IC, look-up table and component data library, etc., the placing decoupling capacitor step 60 of process flow 10 shown in FIG. 1 is performed to place appropriate decoupling capacitors on suitable locations in IC design, in order to compensate the voltage drop caused in switching state of semiconductor components, and decrease the electrical variations and noise caused by the voltage drop, so that a stable voltage level can be maintained. For example, an additional decoupling capacitor 230 is electrically connected to the unit block 110 shown in FIG. 3 for decreasing voltage variation.

Furthermore, after placing appropriate capacitors on suitable locations in IC design, the step of AC analysis 50 is performed once or twice onto the IC design by utilizing circuit simulation and analysis software for obtaining the consumption and distribution of power of the power network model 100 after placing decoupling capacitors.

The advantage of the present invention is to provide a method for analyzing power noise and a method for reducing power noise. By defining the power network model of IC design constructed by many unit blocks, an AC analysis is performed onto the power network model of IC design in accordance with the parameters, such as type, quantity, operation parameters, geometric parameters and other related data, of components electrically connected to each of the unit blocks by utilizing circuit simulation and analysis software, in order to obtain the voltage drop and power consumption of each of the unit blocks, so as to place appropriate decoupling capacitors on suitable locations in IC design for decreasing the voltage drop and power noise caused in switching state of components, and maintaining stable voltage level.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for analyzing power noise, wherein the method for analyzing power noise is utilized in an IC design, and comprises:

providing a power network model of the IC design;

according to a predetermined method, defining the power network model as being constructed by a plurality of unit blocks;

according to a position of each of the plurality of unit blocks and a covering range thereof, obtaining a plurality of data of a plurality of components that are electrically connected with each of the plurality of unit blocks, wherein the plurality of data are regarded as a reference data of each of the plurality of unit blocks;

performing a sieving process onto the reference data of each of the plurality of unit blocks for obtaining a sieved data of each of the plurality of unit blocks, wherein the plurality of sieved data of the plurality of unit blocks are processed in an AC analysis step; and performing the AC analysis step according to the plurality of sieved data of the plurality of unit blocks for obtaining an AC analysis result of the power network model.

2. The iriethod for analyzing power noise according to claim 1, wherein the AC analysis result comprises power consumption and voltage drop of each of the plurality of unit blocks in operation.

3. The method for analyzing power noise according to claim 1, wherein further comprising performing a power network analysis step onto the IC design for obtaining the power network model of the IC design.

4. The method for analyzing power noise according to claim 1, wherein the power network model comprises a DC power network model data and an AC power network model data of the iC design.

5. The method for analyzing power noise according to claim 1, wherein the predetermined method is a method defining the plurality of unit blocks of the power network model as a plurality of rectangles by utilizing a plurality of metal lines which are constructing the power network model, and the plurality of rectangles are constructed by the plurality of metal lines.

6. The method for analyzing power noise according to claim 1, wherein the plurality of components comprises a plurality of logic components, a plurality of clock buffers and a plurality of parasitic components.

7. The method for analyzing power noise according to claim 1, wherein the sieving process is based on the plurality of data, which comprises the information of type, quantity, operation parameters and geometric parameters for the plurality of components, to define at least one sieving condition of the sieving process.

8. The method for analyzing power noise according to claim 1, wherein further comprising placing a plurality of decoupling capacitors on a plurality of locations of the IC design according to the AC analysis result after obtaining the AC analysis result of the power network model.

* * * * *

UNITED STATES PATENT AND TRADEMARK OFFICE
CERTIFICATE OF CORRECTION

PATENT NO. : 7,079,998 B2 Page 1 of 1
APPLICATION NO. : 10/299361
DATED : July 18, 2006
INVENTOR(S) : Tien et al.

It is certified that error appears in the above-identified patent and that said Letters Patent is hereby corrected as shown below:

Column 7, Line 16, Claim 2, "The iriethod" should read -- The method --

Column 7, Line 27, Claim 4. "the iC design" should read -- the IC design --

Signed and Sealed this

Twelfth Day of December, 2006

JON W. DUDAS
*Director of the United States Patent and Trademark Office*